United States Patent
Sihler (10) Patent No.: US 7,423,411 B2
(45) Date of Patent: Sep. 9, 2008

(54) RESISTIVE TORSIONAL MODE DAMPING SYSTEM AND METHOD

(75) Inventor: Christof Martin Sihler, Hallbergmoos (DE)

(73) Assignee: General Electric Company, Niskayuna, NY (US)

( * ) Notice: Subject to any disclaimer, the term of this patent is extended or adjusted under 35 U.S.C. 154(b) by 145 days.

(21) Appl. No.: 11/381,900

(22) Filed: May 5, 2006

(65) Prior Publication Data

US 2007/0279012 A1   Dec. 6, 2007

(51) Int. Cl.
*H02H 7/06* (2006.01)
*H02P 9/00* (2006.01)
*H02P 11/00* (2006.01)

(52) U.S. Cl. ........................................ 322/19
(58) Field of Classification Search .................... 322/19
See application file for complete search history.

(56) References Cited

U.S. PATENT DOCUMENTS

| | | | | |
|---|---|---|---|---|
| 3,950,986 | A * | 4/1976 | Parkinson | 73/862.28 |
| 4,080,559 | A | 3/1978 | Wright et al. | 322/58 |
| 4,302,715 | A | 11/1981 | Putman et al. | 323/210 |
| 4,377,780 | A * | 3/1983 | Bjorklund | 322/29 |
| 4,627,298 | A * | 12/1986 | Sahashi et al. | 73/862.336 |
| 4,665,475 | A * | 5/1987 | Brandstatter | 363/56.06 |
| 4,695,736 | A * | 9/1987 | Doman et al. | 290/44 |
| 4,726,738 | A * | 2/1988 | Nakamura et al. | 417/22 |
| 4,736,143 | A * | 4/1988 | Nakamura et al. | 318/432 |
| 4,907,462 | A * | 3/1990 | Obama et al. | 73/862.335 |
| 4,993,527 | A * | 2/1991 | Benford et al. | 477/65 |
| 5,198,745 | A | 3/1993 | Larsen et al. | 322/58 |
| 5,202,833 | A * | 4/1993 | Fodale | 701/68 |
| 5,759,133 | A * | 6/1998 | Treinies et al. | 477/110 |
| 6,072,297 | A * | 6/2000 | Xu et al. | 318/630 |
| 6,163,121 | A * | 12/2000 | Kumar et al. | 318/434 |
| 6,166,929 | A | 12/2000 | Ma et al. | 363/37 |
| 6,756,758 | B2 * | 6/2004 | Karikomi et al. | 318/434 |
| 6,903,529 | B2 * | 6/2005 | Kunzel et al. | 318/611 |
| 7,019,990 | B2 * | 3/2006 | Huber | 363/39 |

(Continued)

FOREIGN PATENT DOCUMENTS

DE   100 38 816 A1   6/2002

(Continued)

OTHER PUBLICATIONS

GB Search Report, GB0708775.2, Sep. 1, 2007.

(Continued)

*Primary Examiner*—Darren Schuberg
*Assistant Examiner*—Pedro J Cuevas
(74) *Attorney, Agent, or Firm*—Ann M. Agosti (57) ABSTRACT

A resistive torsional mode damping system for a shaft of a machine includes: a sensor configured for sensing a signal representative of torque on the shaft; a controller configured for using the sensed signal for detecting a presence of a torsional vibration on the shaft corresponding to a natural frequency of the shaft and for generating control signals for damping the torsional vibration; and a damper including a damping converter and resistor coupled to a DC output of the damping converter, the damping converter being coupled to the machine through a power bus and having a power rating on the order of less than or equal to about five percent of a nominal power of the machine.

21 Claims, 8 Drawing Sheets

U.S. PATENT DOCUMENTS

| | | | |
|---|---|---|---|
| 7,173,399 B2* | 2/2007 | Sihler et al. | 322/40 |
| 7,357,204 B2* | 4/2008 | Hisada et al. | 180/65.2 |
| 2005/0013145 A1* | 1/2005 | Huber | 363/34 |
| 2005/0017512 A1* | 1/2005 | Kikuchi et al. | 290/44 |
| 2006/0232250 A1* | 10/2006 | Sihler et al. | 322/58 |
| 2007/0030707 A1 | 2/2007 | Wei et al. | 363/44 |
| 2007/0272456 A1* | 11/2007 | Shiiba | 180/65.2 |
| 2007/0275819 A1* | 11/2007 | Hirata | 477/5 |
| 2007/0284176 A1* | 12/2007 | Sah et al. | 180/305 |
| 2008/0004159 A1* | 1/2008 | Kubonoya et al. | 477/115 |
| 2008/0017427 A1* | 1/2008 | Nakanowatari | 180/65.2 |
| 2008/0023285 A1* | 1/2008 | Tsunekawa | 192/3.3 |
| 2008/0026898 A1* | 1/2008 | Supina et al. | 475/5 |
| 2008/0026905 A1* | 1/2008 | Dickinson | 477/62 |
| 2008/0032855 A1* | 2/2008 | Sah et al. | 477/3 |
| 2008/0045093 A1* | 2/2008 | Tamba et al. | 440/38 |

FOREIGN PATENT DOCUMENTS

| | | |
|---|---|---|
| WO | WO2004112234 | 12/2004 |
| WO | WO2006007891 | 1/2006 |

OTHER PUBLICATIONS

DE10326816 Abstract, Jun. 13, 2003.

"First Supplement to a Bibliography for the Study of Subsynchronous Reasonance Between Rotating Machines and Power Systems", IEEE Transactions on Power Apparatus and Systems, vol. PAS-98, No. 6, Nov./Dec. 1979, pp. 1872-1875.

C. Sihler, "Suppression of Torsional Vibrations in Roto Shaft Systems by a Thyristor Controlled Device", 2004 IEEE, pp. 1424-1430.

C. Wu, et al., Application of Simultaneous Active and Reactive Power Modulation of Superconducting Magnetic Energy Storage Unit to Damp Turbine-Genereator Subsynchronous Oscillations, IEEE Trans. on Energy Conversion, vol. 8, No. 1, Mar. 1993, pp. 63-70.

"Symposium on Countermeasures for Subsynchronous Resonance", The IEEE Power Engineering Society, 1981 Summer Meeting, Jul. 30, 1981.

U.S. Appl. No. 11/110,547, filed Apr. 19, 2005, title: "Integrated Torsional Mode Damping System and Method".

F. Joswig et al., "Perceptions About New Kinds of Subsynchronous Resonances," IPST '01, International Conference on Power Systems Transients, Rio de Janeiro, 6 pages, Jun. 24-28, 2001.

* cited by examiner

RESISTIVE TORSIONAL MODE DAMPING SYSTEM AND METHOD

BACKGROUND

The invention relates generally to damping torsional vibrations.

Shaft assemblies in strings of prime movers and loads comprising turbine generators, electrical motors, or compressors, for example, sometimes exhibit weakly damped mechanical resonances (torsional modes) with frequencies which can also fall below the network synchronous frequency. Mechanical damage can occur over time if an electric network exchanges significant energy with a generator at one or more of the natural frequencies of the shaft systems. Conventional countermeasures for torsional resonance phenomena include efforts to eliminate the source of resonance excitation by, for example, changing the network, operational, or control parameters.

When a power system has a connection to a large utility network with many gigawatts of generated power, electrical loads on the power system have only a negligible effect. In contrast, island power systems have no connection to a large utility network and island-like power systems have only a weak connection to a utility network (such as by means of a long transmission line with a comparably high impedance). Island and island-like power systems are commonly used in the marine industry (for example, onboard power systems of large ships), isolated on-shore installations (for example, wind turbine systems), and the oil and gas industry. In such power systems, the loads are typically large relative to the network (such that the loads can potentially affect the network). With increasing ratings of electrical motors and drives in these systems, the mechanical and electrical dynamics are increasingly coupled, thus making it difficult to avoid torsional oscillations in motor or generator drive trains by conventional countermeasure techniques.

One method for suppressing torsional vibrations in synchronous generators is described in C. Sihler, "Suppression of torsional vibrations in rotor shaft systems by a thyristor controlled device," 35$^{th}$ *Annual IEEE Power Electronics Specialist Conference*, pages 1424-1430 (2004). The method includes applying a torque in counter phase to a measured torsional velocity by means of an additional thyristor converter circuit comprising a DC inductor. This method is most applicable to embodiments wherein the installation of a separate line commutated converter system and a separate energy storage (inductor or capacitor) is technically and economically feasible.

Another method for suppressing torsional vibrations is described in commonly assigned Sihler, U.S. patent application Ser. No. 11/110,547. The method includes sensing a signal representative of torque on a shaft coupled to the inverter or the rectifier of a converter system comprising a DC link, using the sensed signal for detecting a presence of a torsional vibration on the shaft corresponding to a natural frequency of the shaft, and damping the torsional vibration by modulating active power through the respective inverter or rectifier.

It would be desirable to have options that are less complex or expensive than these prior methods but that are still sufficient to minimize shaft damage due to torsional vibrations.

BRIEF DESCRIPTION

Briefly, in accordance with one embodiment of the present invention, a resistive torsional mode damping system for a shaft of a machine comprises a sensor configured for sensing a signal representative of torque on the shaft; a controller configured for using the sensed signal for detecting a presence of a torsional vibration on the shaft corresponding to a natural frequency of the shaft and for generating control signals for damping the torsional vibration; a damper comprising a damping converter and a resistor coupled to a DC output of the damping converter, the damping converter being coupled to the machine through a power bus and having a power rating on the order of less than or equal to about five percent of a nominal power of the machine.

In accordance with another embodiment of the present invention, a resistive torsional mode damping method for a shaft of a machine comprises: sensing a signal representative of torque on the shaft; using the sensed signal for detecting a presence of a torsional vibration on the shaft corresponding to a natural frequency of the shaft and for generating control signals for damping the torsional vibration; and providing the control signals to a damper comprising a damping converter and a resistor coupled to a DC output of the damping converter, wherein the damping converter is coupled to the machine through a power bus and has a power rating on the order of less than or equal to about five percent of a nominal power of the machine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
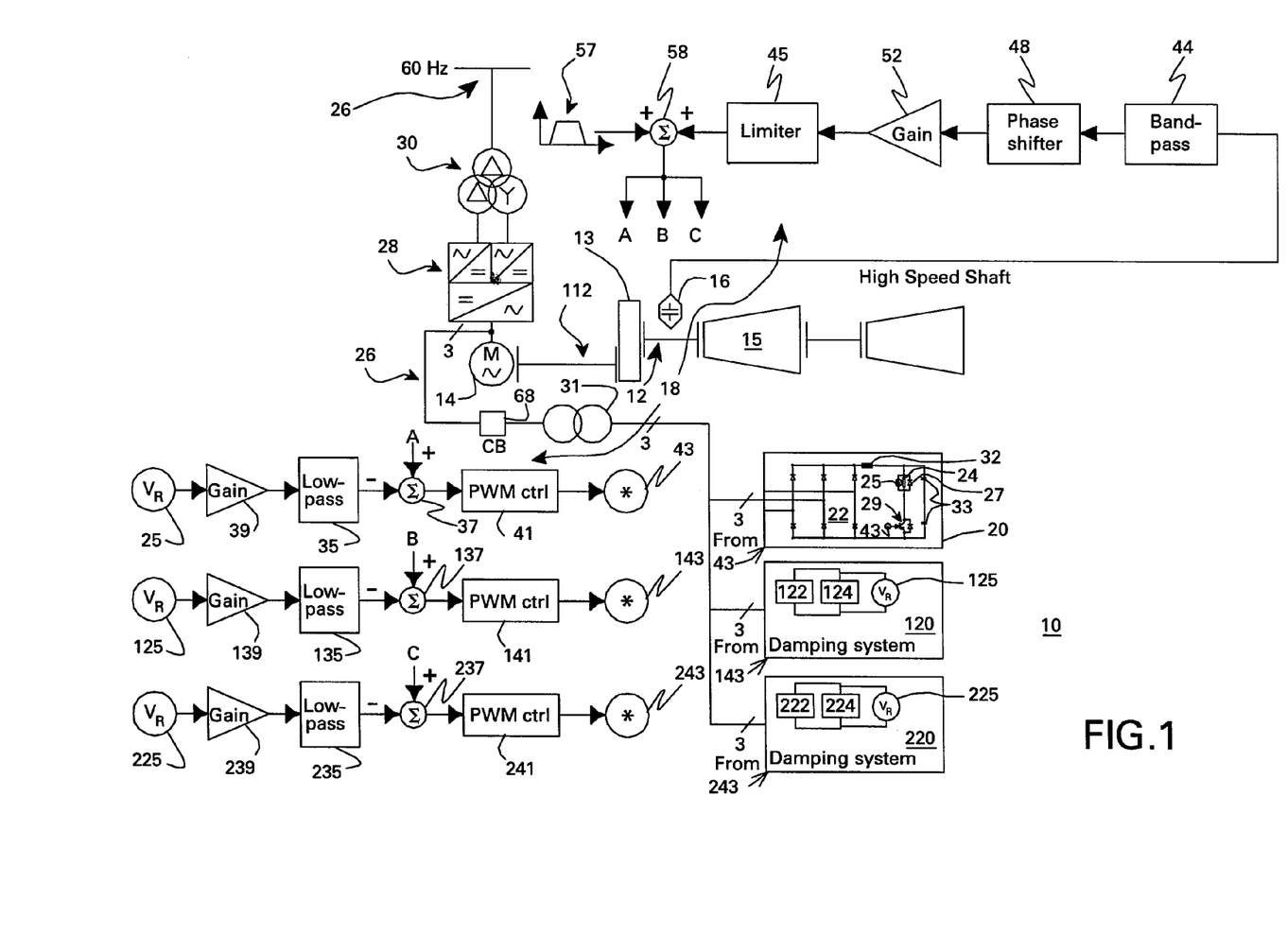
FIG. 1 is a block diagram of a system for damping torsional vibrations in accordance with an embodiment of the present invention wherein a damping converter and resistor are controlled in response to signals representative of torque that are obtained from a motor shaft.
Figure 4:
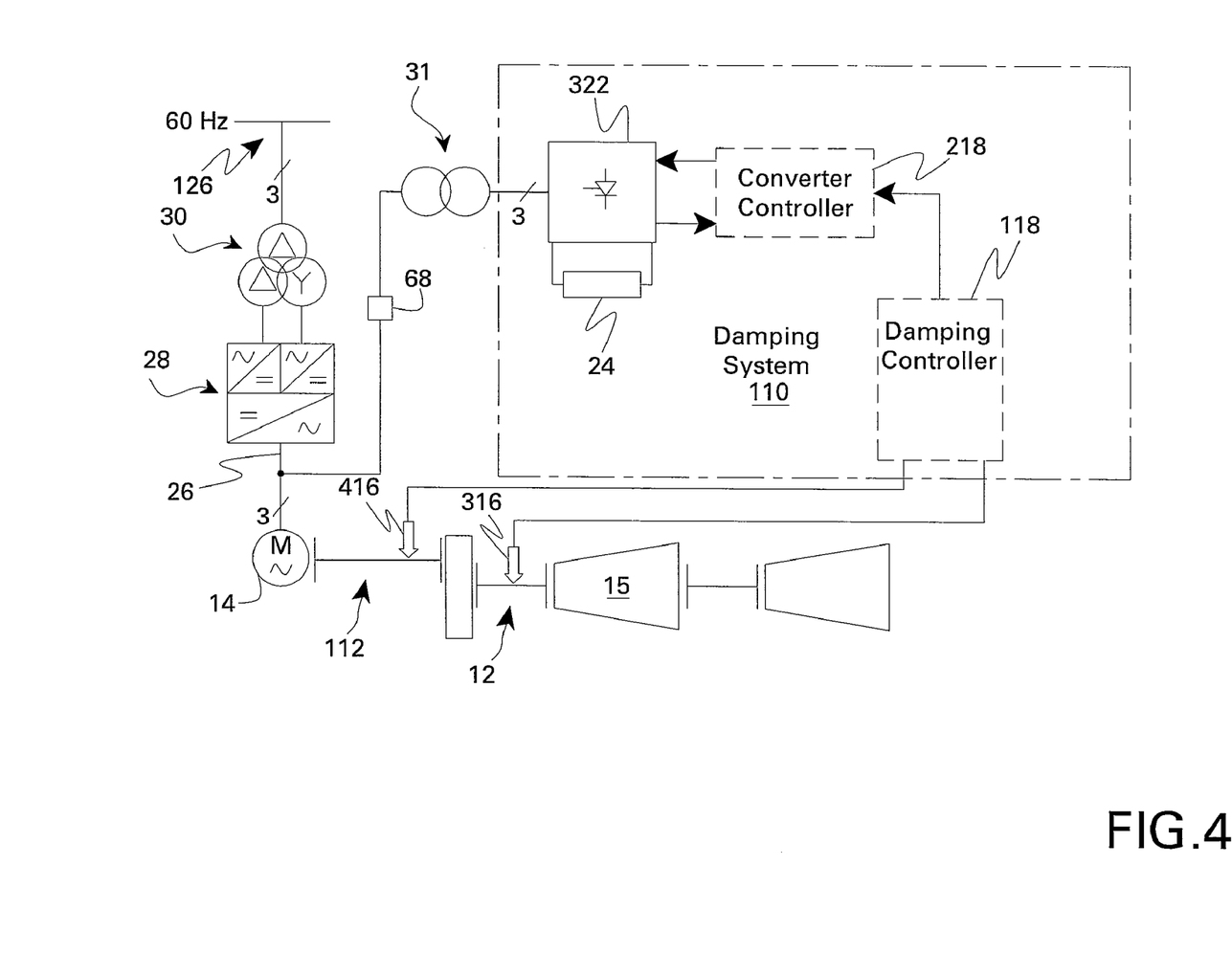
FIG. 4 is a block diagram of another system for damping torsional vibrations in accordance with an embodiment of the present invention wherein a damping converter and resistor are coupled to a power bus and are controlled in response to signals representative of torque that are obtained from a motor shaft.

FIG. 1 is a block diagram of a resistive torsional mode damping system 10 for a shaft 12 of a machine 14. Damping system 10 comprises a sensor 16 configured for sensing a signal representative of torque on shaft 12 and a controller 18 configured for using the sensed signal for detecting a presence of a torsional vibration on shaft 12 corresponding to a natural frequency of the shaft assembly and for generating control signals for damping the torsional vibration (which is shown in two separate portions 1 of FIG. 1 for purposes of fitting FIG. 1 on one sheet). Damping system 10 further comprises a damper 20 comprising a damping converter 22 and resistor 24 coupled to a DC output of damping converter 22. The damping converter is coupled to machine 14 through a power bus 26 (sometimes referred to as a bus bar or grid). The damping converter typically has power rating on the order of less than or equal to about five percent of a nominal power of machine 14. As used herein "converter" may include, for example, a diode rectifier 22 as shown in FIG. 1 or an active rectifier 322 as shown in FIG. 4.

The illustrated damping systems are useful in many contexts including, for example, wind turbines, electric-motor driven compressors, and manufacturing lines. In the embodiment of FIG. 1, machine 14 comprises a motor. The present invention is not limited to motor embodiments. For example, a generator embodiment is described with respect to FIGS. 2 and 8. "Coupled" in the context of the shaft may include electrical coupling such as via a motor or generator or more indirect coupling such as via a compressor 15 coupled to a motor 14 through a low speed shaft 112, a gearbox 13, and a high speed shaft 12, for example. "Controller" or "control" as used herein is meant to encompass any appropriate analog, digital, or combinations of analog and digital circuitry or processing units used to accomplish the designated control function. "A" and "an" as used herein mean at least one unless indicated to the contrary.

Typically the presence of the torsional vibration is detected when the sensed signal is indicative of a natural frequency of the shaft. In one embodiment, the sensed signal that is representative of torque is obtained by a torque sensor 16, whereas other embodiments may use indirect sensors (such as speed sensors) which either are representative of torque or can be used to determine torque. In the torque sensor embodiment, a torque sensor 16 is selected which is capable of measuring torsional vibrations in the intended assembly with sufficient accuracy. For example, for large diameter drive train embodiments, because of the high stiffness of the rigid shafts, the torsional angles along the shaft are often very small (hundredths to tenths of one degree) but the resulting torsional stress is high. The small torsional angle and high rotational speed of such shafts make it difficult to accurately measure torsional vibrations if conventional measurement devices such as speed sensors are applied. One contact-less sensor that provides inductive measurement of torque at different locations is available from the Fraunhofer Institute ITWM, for example. Alternatively, one example of a contact type torque sensor is a strain gauge sensor.

In the embodiment of FIG. 1, power bus 26 is coupled in turn to a motor drive 28, which in one embodiment comprises a variable speed drive, and is in turn coupled to a power bus 126 (optionally through a transformer 30). Coupling damper 20 at power bus 26 (between motor 14 and motor drive 28) and using diode rectifier 22 and capacitor 33 to create a defined (smoothed) DC voltage is useful for highly distorted power systems such as, for example, systems where direct use of a line commutated converter for active damping is impractical. In this embodiment, the capacitor is used not for energy storage but for smoothing of the DC voltage. In another embodiment the capacitor is eliminated. Elimination of the capacitor causes additional harmonics in the modulated active power which may be acceptable for some damping applications where a low cost solution is desired.

Figure 2:
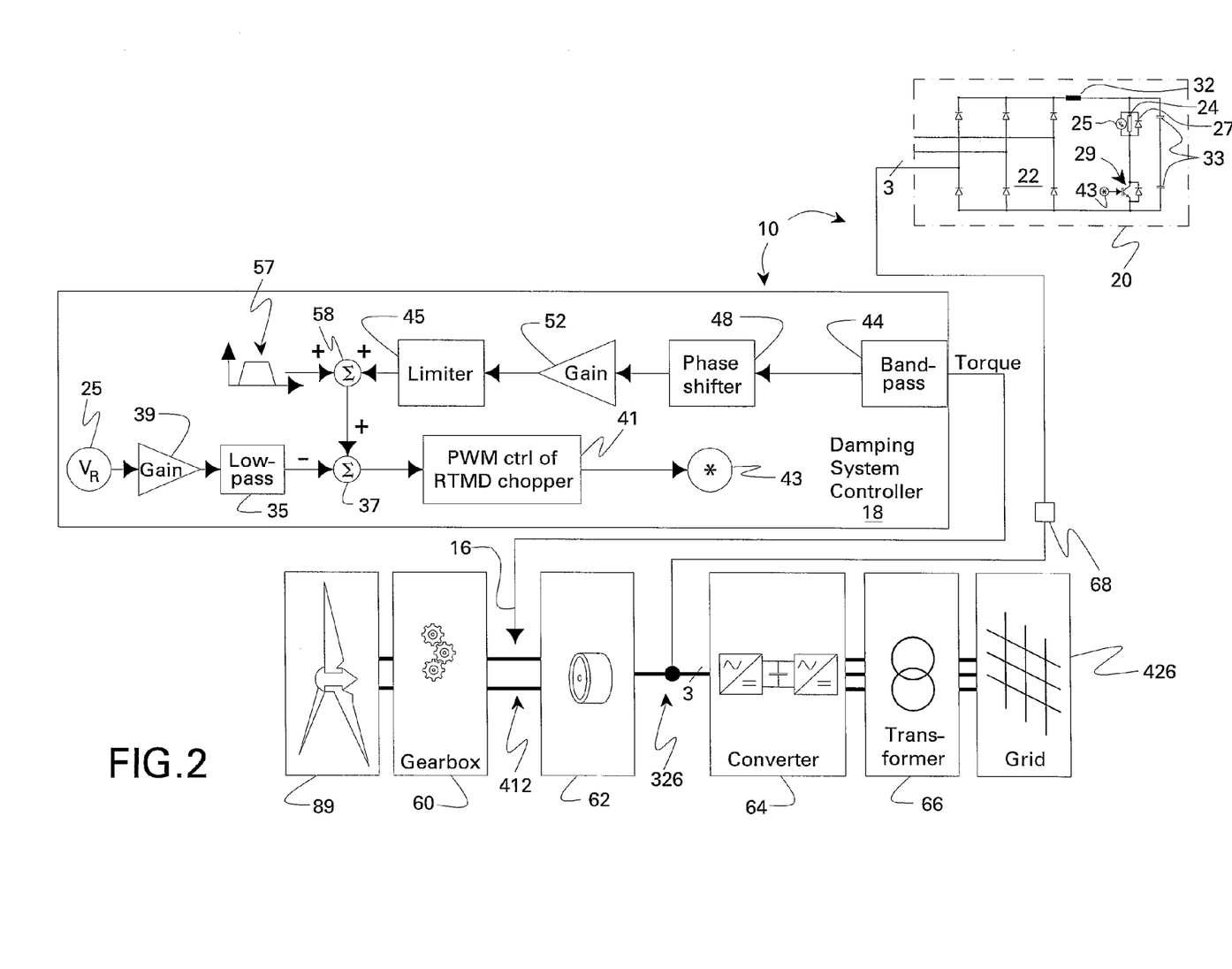
FIG. 2 is a block diagram of a system for damping torsional vibrations in accordance with an embodiment of the present invention wherein a damping converter and resistor are controlled in response to signals representative of torque that are obtained from a generator shaft.

"Highly distorted" is intended to refer to systems that have a total harmonic distortion (THD) higher than five percent as defined in IEEE Standard 519. THD values above five percent are typical for variable frequency three-phase systems of high power motors being supplied by line commutated converters and other converter types based on thyristors. High THD values may also be experienced in island or island-like power systems. One example includes shaft generators used for power extraction from a prime mover, such as a ship diesel engine or a turbine driven airplane engine. Depending on the loads connected and depending on the operating conditions (such as start-up of electrical auxiliary motors), THD values above five percent may sometimes occur when time-reliable torsional mode damping may be desirable. Another example includes wind farms operating during grid faults. Reliable torsional mode damping in power systems with (transiently) high THD may include a converter design as shown in FIGS. 1 or 2 where the active damping power generation is not based on the distorted system voltages.

Although the terms generator, rectifier, inverter, and motor are used for purposes of illustration, these elements can be configured for working in either available mode as described in aforementioned Sihler, U.S. patent application Ser. No. 11/110,547. In the embodiment of FIG. 1, damping converter 22 comprises an additional (discrete) converter (as compared with converters which may already be present in the power system). Although an additional converter increases cost, such options are useful for embodiments wherein an integral converter cannot easily be incorporated. The principles described herein are applicable in any voltage or current source converter embodiment.

By using resistor 24 for the dissipation, the embodiment of FIG. 1 can be used to achieve some of the goals of the aforementioned C. Sihler, "Suppression of torsional vibrations in rotor shaft systems by a thyristor controlled device," 35$^{th}$ Annual IEEE Power Electronics Specialist Conference, pages 1424-1430 (2004) at reduced cost and complexity (while maintaining effectiveness for the mechanical system). A resistive damping system extracts power from the machine shaft system and does not feed back power to the machine as would be the case when an energy storage element such as a capacitor or an inductor is used in order to modulate active power. Therefore, a resistive damper requires operation of the converter in only one quadrant (thyristor firing angle below 90°) thus significantly reducing the risk of commutation errors, especially when using a thyristor controlled damper in a highly distorted power system as shown in FIG. 1.

A transformer 31 may optionally be used for coupling damper 20 to power bus 26 and is useful for adjusting the voltage level and also for reducing the effect of distorted voltages on any line commutated converters. Alternatively, the damping system may be applied directly in three-phase systems with high THD (in order to save the costs for an additional transformer). A circuit breaker 68 may be included to facilitate disconnection of damper 20 from the power bus.

In operation, damper 20 is controlled (via control signals) to selectively transfer (or "dump") power from power bus 26 to damping resistor 24. The removal of power has a corresponding effect on the shaft designed to approximately counter any vibrations that are corresponding to its natural frequency.

In the embodiment of FIG. 1, damper 20 further includes a pulse width modulated (PWM) element 29 coupled in parallel with resistor 24, and controller 18 is configured for using the signal from sensor 16 for detecting a presence of a torsional vibration and supplying PWM control signals to PWM element 29 for damping the torsional vibration. In one embodiment, PWM element 29 comprises a PWM controlled insulated gate bipolar transistor or an integrated gate commutated thyristor (IGCT) which in a further embodiment is coupled to an anti-parallel diode. Using a single active element (PWM element 29) results in a convenient damping embodiment.

An additional sensor 25 is used in the embodiment of FIG. 1 for obtaining a parameter representative of a voltage or a current across resistor 24 for use by controller 18. Controller 18 typically comprises a band pass filter 44 for passing sensor signals at a frequency corresponding to the natural mode, a phase shifter 48 for adjusting the phase shift of each filtered signal to the correct value, and a gain element 52 for controlling the magnitude of the adjusted signal.

Typically the modulation is an approximation of a sine wave. The frequency of the modulation corresponds to the natural frequency, and the degree corresponds to the amplitude of the torsional oscillation. Bandpass filter 44 is used in order to derive signals from the torque measurement that represent the oscillating components of the torque. The signal at the output of the bandpass filter is an approximate sine wave with one defined frequency corresponding to one major natural frequency of the shaft assembly.

Phase shifter 48 is used to adjust the phase shift of the approximate sine wave signal to the correct value. If desired, adjustable delay time modules can be used instead of phase shifters. For optimum damping, the approximate sine wave signals are fed back with a phase shift of 90° (lagging). If a lagging phase angle of 90° cannot be achieved, the phase shifter can be set to cause a total phase lag of 360°+90° between the torque (which is in phase with the torsion angle representing the torsional displacement) and the active power (or air-gap torque) caused by the controller. The total phase lag including all system time constants is typically determined experimentally in performing open-loop tests at low power level.

Providing an adjustable gain (by gain elements 52 for example) enables adjustment of the active power involved with damping the different torsional modes (high gain results in high degree of modulation which in turn results in strong damping effect). Thus this embodiment has the same effect as an increased natural damping of torsional modes with the degree of damping being electronically adjustable.

Controller 18 may further comprise a limiter 45 for limiting the controlled adjusted signal, a DC component element 57 (in the form of an analog signal), and a summation element 58 for obtaining the sum of the limited signal and the DC component (k). Limiter 45 is useful for creating a unipolar signal flow and for performing tests at low damping power level. DC component element 57 and summation element 58 are optional elements (meaning, k may be 0 or greater) which may be beneficial if concern exists about second order harmonics. The higher the k value, the better the sine wave approximation but the higher the resulting power system losses. By using a ramp function of the k value during damping, power system losses can be minimized.

Figure 3:
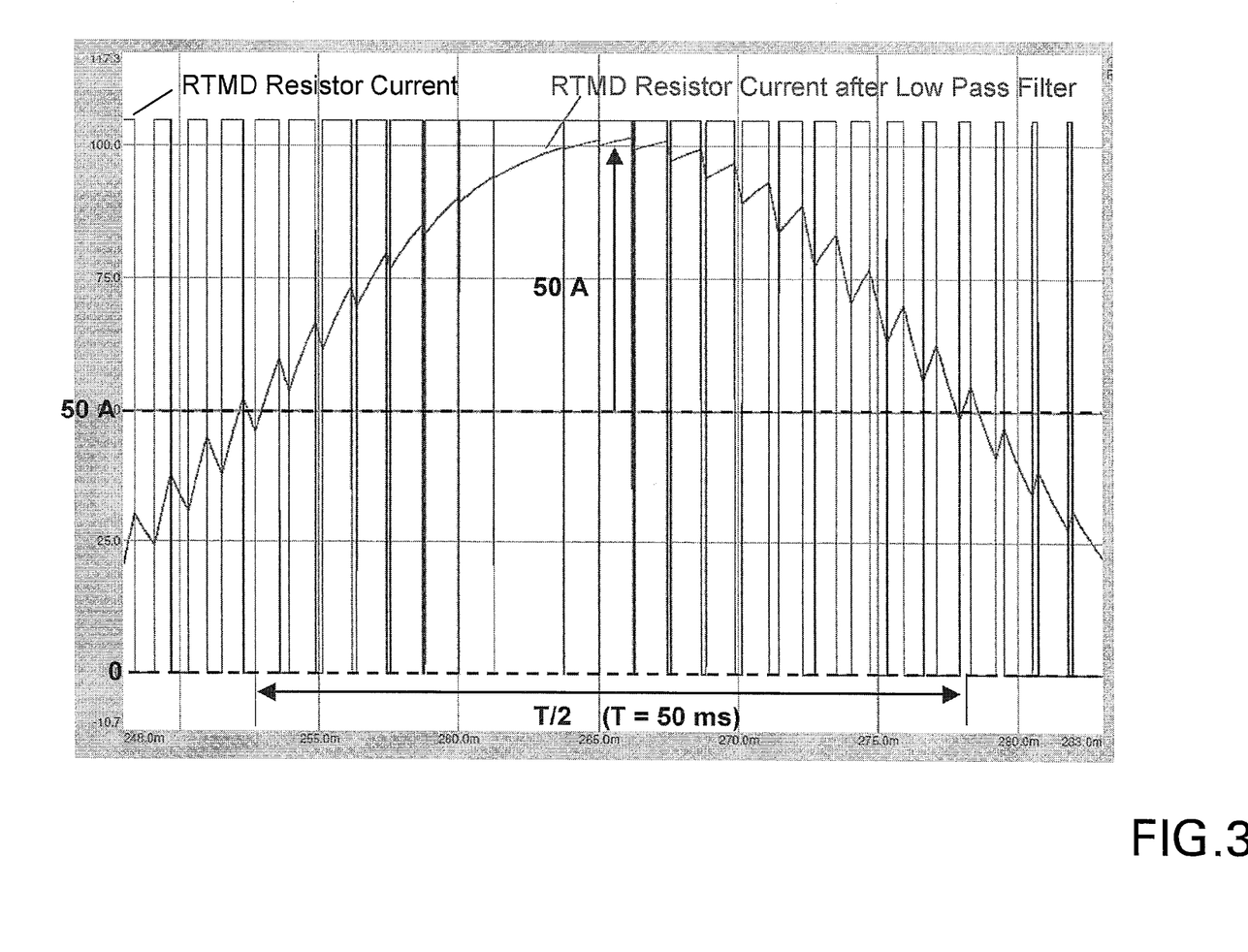
FIG. 3 is a simulated graph illustrating current in amperes versus time in milliseconds for resistor current before and after filtering.

Controller 18 may further comprise a gain element 39 for adjusting the measured parameter from sensor 25, a low pass filter 35 for filtering the parameter from sensor 25 or the gain adjusted parameter if applicable, a difference element 37 for obtaining the difference between the limited signal (and the DC component if applicable) and the filtered parameter, and a PWM control element 41 for generating the PWM control signals 43. Low pass filter 35 is useful for approximating a sine wave as shown in FIG. 3.

In PWM control element 41, pulse width modulation techniques are used to generate a PWM signal 43 designed to drive the difference signal from difference element 37 towards zero. In one embodiment wherein a current signal is used, the following function has been simulated for modulating the current:

$$i(t)=50\,A*(k+\sin(\omega*t)).$$

wherein i represents current, t represents time, A represents amperes, ω represents an angular frequency corresponding to a resonant angular frequency of the shaft assembly, and k is greater than or equal to zero (as discussed above). When the square of i(t) corresponds to the active power, the resulting function is $$i(t)^2=(50\,A)^2*(k^2+2*k*\sin(\omega*t)+(\sin(\omega*t))^2).$$

The second term of this function is dominant and helps to provide approximate sine wave active power dissipation. As discussed above, in some applications a higher k value can be used resulting higher losses but at the same time causing a better sine wave approximation. In other applications where the second harmonic of ω does not show a reaction on the mechanical system, k can be reduced to low values or zero, for example, when the mechanical system has no resonance point close to 2ω.

Although sensor 25 is illustrated as a voltage sensor, sensor 25 may alternatively comprise a current sensor. A diode 27 is optionally coupled in parallel across resistor 24 to ensure that current flows in a single direction and to avoid over voltage conditions when the resistor experiences a stray inductance that is not negligible. PWM element 29 controls the power that is dumped into resistor 24 and results in a convenient embodiment because only one active element is used. Capacitors 33 are coupled across the combination of resistor 24 and PWM element 29 and are used for controlling (smoothing) the voltage across the rectifier so that a defined DC voltage can be achieved. Element 32 comprises a resistor or inductor which is useful, particularly if no transformer 31 is present, to prevent inrush current from reaching capacitors 33.

Unlike the inductor described in aforementioned C. Sihler, "Suppression of torsional vibrations in rotor shaft systems by a thyristor controlled device," 35$^{th}$ Annual IEEE Power Electronics Specialist Conference, the resistor of the present application will not provide an exact sine wave modulation. However, when the first harmonic frequency of the active power corresponds to the frequency of the natural drive train, the torsional suppression will be sufficient to reduce the vibrations in the mechanical system to acceptable levels that will reduce the wear on the shaft and elements coupled to the shaft. These embodiments are especially applicable to systems with natural frequencies significantly above network frequencies (where damping for higher torsional modes is desired) and to applications where electrical machines rotate at high speed (such as above 6000 rpm) so that line commutated converters cannot easily be applied for torsional mode damping. Most issues with torsional vibrations are caused by transients, for instance disturbances in the network or harmonics caused during start-up of a variable speed motor. For solving such issues a damping system based on a resistor is well suited because the damping power extracted from the drive train must only be dumped in the resistor for a short time (typically less than a few seconds).

FIG. 1 further illustrates a modular approach which may be used to more quickly solve torsional issues and to achieve higher reliability of the damping system. In FIG. 1, a plurality of dampers 20, 120, and 220 along with respective converters 22, 122, 222, resistors 24, 124, 224, and sensors 25, 125, 225 are used to provide signals for use by damping system controller 18. Damping system controller 18 in turn has a plurality of respective gain elements 39, 139, 239; low pass filters 35, 135, 235; summation elements 37, 137, 237; and PWM controllers 41, 141, 241 for providing PWM control signals 43, 143, 243 for respective dampers 20, 120, 220. One advantage to a modular design, particularly when identical modules are used, is simplicity and flexibility of adapting the design to different damping needs by changing the number of modules which are used. The time required for designing a damping system can be significantly reduced by performing tests with standard damping modules at low power level in order to determine the number of modules required to achieve sufficient damping. Embodiments comprising an energy storage device for dissipation, such as a capacitor or an inductor, are not economical and are not suited for a modular design because the stored energy is proportional to the square of the current (inductor) or the square of the voltage (capacitor).

FIG. 2 is a block diagram of a system for damping torsional vibrations in accordance with an embodiment of the present invention wherein a damping converter 22 and resistor 24 are controlled in response to signals representative of torque that are obtained from a generator shaft 412. In the example of FIG. 2, a wind turbine blade assembly 59 is coupled to a gearbox 60 which in turn is coupled to a synchronous generator by shaft 412 upon which sensor 16 obtains measurements. Synchronous generator 62 is coupled by a power bus 326 to a voltage source converter 64 which is in turn coupled to a power bus (grid) 426 via a transformer 66. Damper 20 is coupled to power bus 326. This is one example where the transformer shown in FIG. 1 (transformer 31) is typically not required.

FIG. 3 is a simulated graph illustrating current in amperes versus time in milliseconds for resistor current before and after filtering by low pass filter 35. This graph is expected to reflect either the embodiment of FIG. 2 or the embodiment of FIG. 1 with one module and a k value of 1. In this example, an IGBT switching frequency is 800 Hertz and a fundamental frequency of the resistor current is 20 Hertz. The current information is relevant because the time history of the voltage across resistor 24 is expected to correspond to the time history of the current in resistor 24. FIG. 3 shows that a good approximation of a sine wave is expected.

Figure 5:
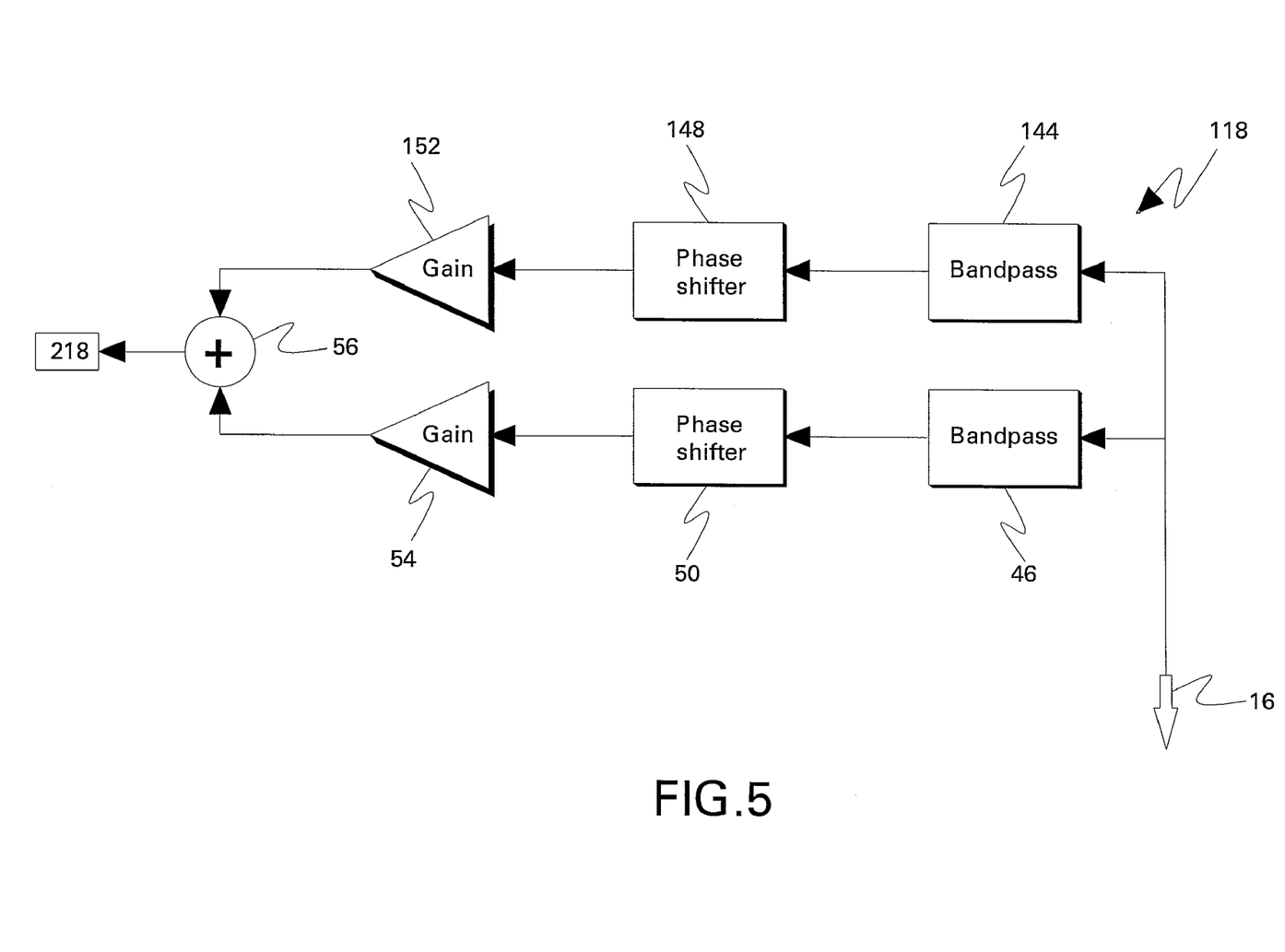
FIG. 5 is a block diagram of an example subsystem for use in the embodiment of FIG. 4.

FIG. 4 is a block diagram of another system 110 for damping torsional vibrations. In the embodiment of FIG. 4, damping system 110 comprises a different type of damping converter 322 (an active rectifier) and controller configuration than that of the embodiment of FIG. 1. FIG. 4 additionally illustrates the use of multiple sensors 316 and 416. FIG. 5 is a block diagram of an example subsystem including controller 118 of FIG. 4, and FIG. 6 is block diagram of another example subsystem including controller 218 of FIG. 4.

FIG. 5 is one embodiment wherein controller 118 comprises a bandpass filter 144, 46 for passing sensor signals at a frequency corresponding to the natural frequency, a phase shifter, 148, 50 for adjusting the phase shift of each filtered signal to the correct value, and a gain element 152, 54 for controlling the magnitude of the adjusted signal. For purposes of example, FIG. 5 illustrates two bandpass filters which are set to detect two natural frequencies, as described in aforementioned Sihler, U.S. patent application Ser. No. 11/110,547. Alternatively, a single bandpass filter or additional bandpass filters may be used. Controller 18 may further comprise DC component element 57 (in the form of an analog signal) and summation element 58 for obtaining the sum of the limited signal and the DC component (k).

Figure 8:
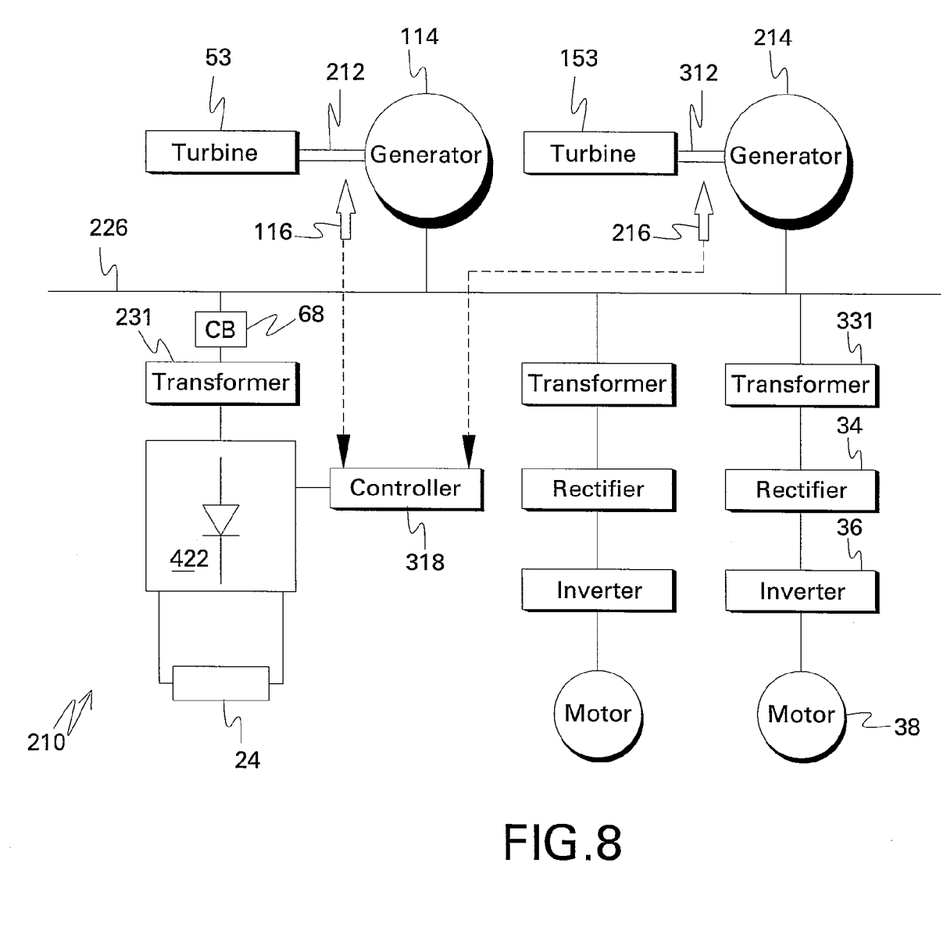
FIG. 8 is a block diagram of another system for damping torsional vibrations in accordance with an embodiment of the present invention wherein a damping converter and resistor are coupled to a power bus and are controlled in response to signals representative of torque that are obtained from generator shafts.

Embodiments with multiple sensors, as shown in FIGS. 4 and 8, may be useful when different natural frequencies are present along the shafts at different locations and are difficult to detect by a common sensor. Alternatively, or in combination, multiple bandpass filters 144 and 46 may be used to perform the desired detection. In the embodiment of FIG. 5, for example, bandpass filter 144 may be used to detect a frequency corresponding to the natural mode occurring in one portion of the shaft assembly 12, and bandpass filter 46 may be used to detect a frequency corresponding to the natural mode occurring in another portion of the shaft assembly. Torque sensor 16, at either of the illustrated portions, will sense a signal (although weaker than a direct measurement embodiment wherein multiple torque sensors are used) relating to the other portion.

Figure 6:
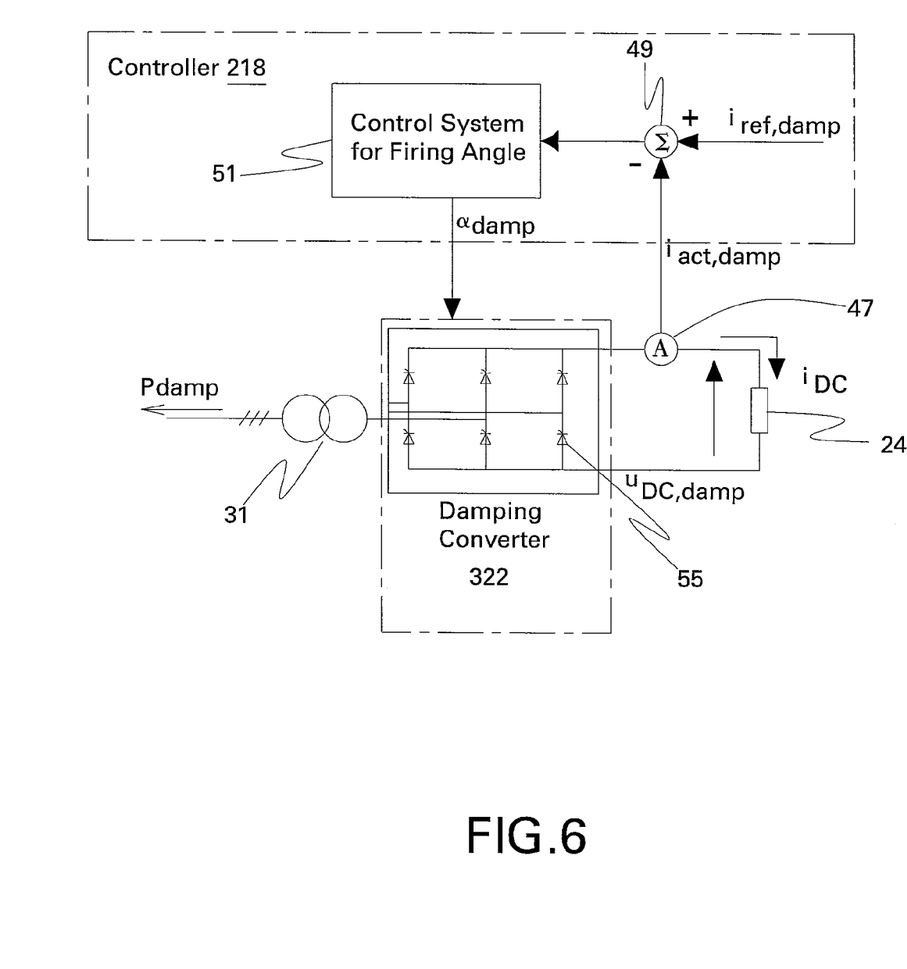
FIG. 6 is block diagram of another example subsystem for use in the embodiment of FIG. 4.

In the embodiment of FIG. 6, damping converter 122 is shown as a three phase controlled active rectifier 322 including converter switches 55. In one example converter 322 comprises a thyristor rectifier with the switches comprises thyristors. In another example wherein a insulated gate bipolar transistor (IGBT) rectifier is used, the switches comprise IGBTs. A sensor 47 is provided for supplying resistor current signals to controller 218. Controller 218 is configured for obtaining a damping command from controller 118, subtracting the current signal from the damping command (with difference element 49), and using the difference when determining the proper firing angles of switches 55 (with control system 51).

Although two controllers 118 and 218 are illustrated in FIGS. 4-6 for purposes of example, any desired controller configuration may be used. For example, one controller may be used to provide both functions. As another example, some converters include integral controllers. As another example, multiple sensor level controllers may be used to obtain signals for use by a master controller.

Figure 7:
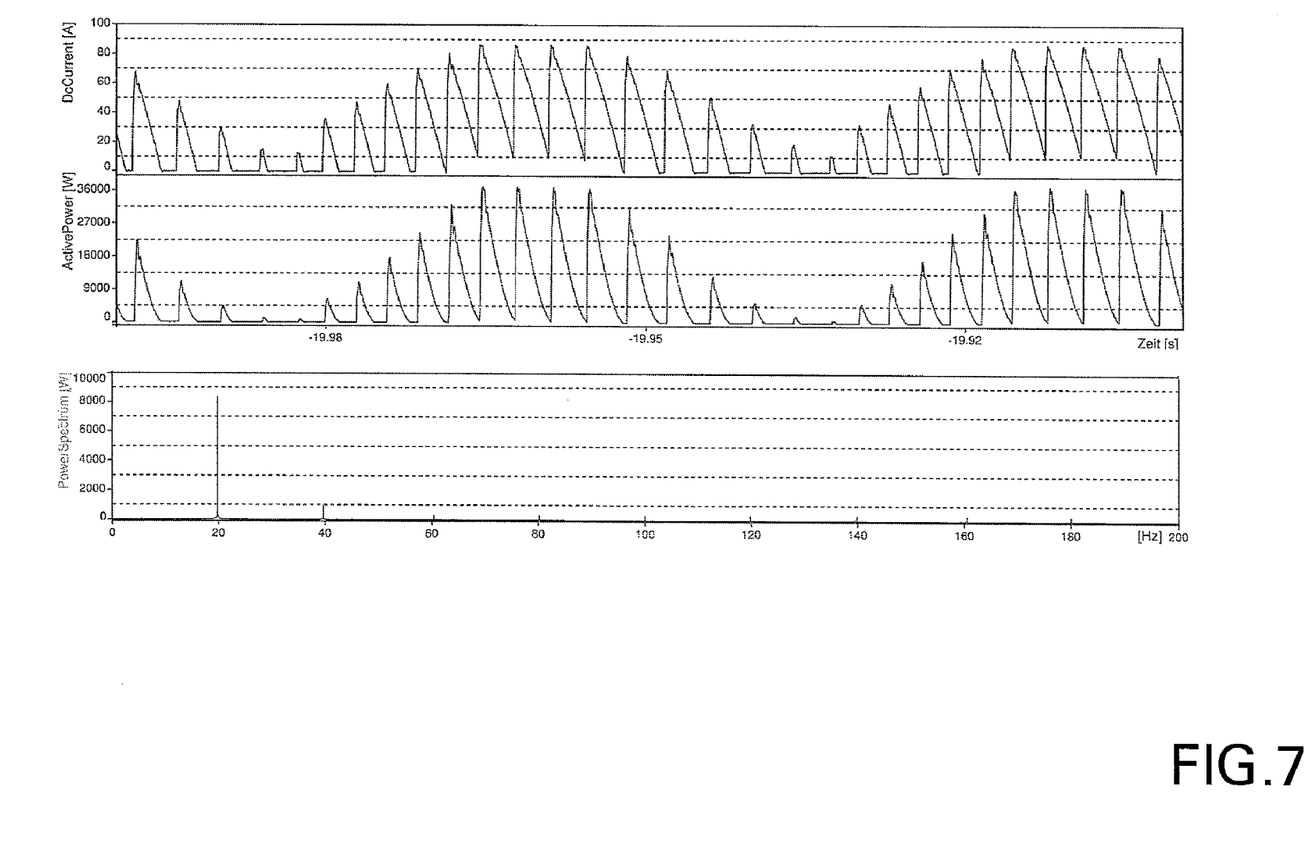
FIG. 7 is a simulated graph illustrating DC current and active power over time as well as a fast Fourier transform obtained from a simulation of the embodiment of FIGS. 4-6.

FIG. 7 is a graph of DC current in resistor 24 and active power over time as well as a fast Fourier transform (FFT) obtained from a simulation of the embodiment of FIGS. 4-6. In this example, the converter comprises a six-pulse thyristor bridge, and a fundamental frequency of the resistor current is 20 Hertz. FIG. 7 illustrates that, although the current and power are not expected to have perfect sine waves, the resulting FFT has a clear primary peak and indicates that resulting current and power are expected to be useful for meeting the system objectives.

FIG. 8 is a block diagram of another system 210 for damping torsional vibrations in accordance with an embodiment of the present invention wherein a damping converter 422 and resistor 24 are coupled to a power bus 226 and are controlled in response to signals representative of torque that are obtained from a generator 114 shaft 212. Damping converter may comprise, for example, a rectifier of the type discussed above with respect to FIG. 1 or a rectifier of the type discussed above with respect to FIG. 4. For purposes of example, two generators 114 and 214, two shafts 212 and 312, and two sensors 116 and 216 are illustrated, but the embodiments described herein are applicable to one or more shafts and one or more sensors. Additionally, as discussed above, one or more controllers 318 may be used to implement the control functions. One or more turbines 53 and 153 may be used to drive generators 114 and 214 with several examples of turbines including wind turbines, gas turbines, and steam turbines. As discussed with respect to FIG. 1, in the embodiment of FIG. 8, damping converter 422 comprises an additional converter (as compared with any converters 34, 36 that are already present in the power system and couple machines 38 to power bus 226 via transformer 331).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A resistive torsional mode damping system for a shaft of a machine, the system comprising:
   a sensor configured for sensing a signal representative of torque on the shaft;
   a controller configured for using the sensed signal for detecting a presence of a torsional vibration on the shaft corresponding to a natural frequency of the shaft and for generating control signals for damping the torsional vibration, wherein the controller comprises a bandpass filter for passing sensor signals at a frequency corresponding to the natural mode and a phase shifter for adjusting the phase shift of each filtered signal to the correct value;
   a damper comprising a damping converter and a resistor coupled to a DC output of the damping converter, the damping converter being coupled to the machine through a power bus and having a power rating on the order of less than or equal to about five percent of a nominal power of the machine.

2. The damping system of claim 1, further comprising a pulse width modulated (PWM) element coupled in series with the resistor and configured for receiving the control signals, wherein the damping converter comprises a diode rectifier.

3. The damping system of claim 2 wherein the PWM element comprises an insulated gate bipolar transistor or an integrated gate commutated thyristor.

4. The damping system of claim 2, further comprising a capacitor coupled in parallel with the combination of the resistor and the PWM element.

5. The damping system of claim 4 wherein the damping system is configured for energy dissipation but not for energy storage.

6. The damping system of claim 2 further comprising an additional sensor for obtaining a parameter representative of a voltage or a current across the resistor.

7. The damping system of claim 1 wherein the controller further comprises a limiter for limiting the controlled adjusted signal, a low pass filter for filtering the parameter, a difference element for obtaining the difference between the limited signal and the filtered parameter, and a PWM control element for generating the control signals.

8. The damping system of claim 1 wherein the machine comprises a motor.

9. The damping system of claim 8 wherein the damping converter comprises a thyristor rectifier.

10. The damping system of claim 8 wherein the damping converter comprises an IGBT rectifier.

11. The damping system of claim 1 wherein the controller further comprises a gain element for controlling the magnitude of the adjusted signal.

12. The damping system of claim 1 wherein the machine comprises a generator.

13. The damping system of claim 1 embodied within an electric-motor driven compressor, a wind turbine, or a manufacturing line.

14. The damping system of claim 1 wherein the damper comprises a plurality of dampers each comprising a respective damping converter and a respective resistor coupled to the DC output of the respective damping converter, each respective damping converter being coupled to the machine through the power bus and having a power rating on the order of less than or equal to about five percent of a nominal power of the machine.

15. The damping system of claim 14 wherein at least two of the plurality of dampers are identical.

16. The damping system of claim 1 wherein damping converter comprises a discrete damping converter.

17. A resistive torsional mode damping method for a shaft of a machine, the method comprising:
   sensing a signal representative of torque on the shaft;
   bandpass filtering the signal to pass sensor signals at a frequency corresponding to the natural mode;
   adjusting the phase shift of each filtered signal to the correct value, and a gain element for controlling the magnitude of the adjusted signal
   using the adjusted signal for detecting a presence of a torsional vibration on the shaft corresponding to a natural frequency of the shaft and for generating control signals for damping the torsional vibration;
      providing the control signals to a damper comprising a damping converter and a resistor coupled to a DC output of the damping converter, wherein the damping converter is coupled to the machine through a power bus and has a power rating on the order of less than or equal to about five percent of a nominal power of the machine.

18. The damping method of claim 17 wherein the damper further comprises a pulse width modulated (PWM) element coupled in series with the resistor, and wherein providing the control signals comprises providing the control signals to the PWM element.

19. The damping method of claim 17 wherein the damping converter comprises an active rectifier, and wherein providing the control signals comprises providing the control signals to switches of the rectifier.

20. A resistive torsional mode damping system for a shaft of a wind turbine, the system comprising:
   a sensor configured for sensing a signal representative of torque on the shaft of the wind turbine;
   a controller configured for using the sensed signal for detecting a presence of a torsional vibration on the shaft corresponding to a natural frequency of the shaft and for generating control signals for damping the torsional vibration, wherein the controller comprises a bandpass filter for passing sensor signals at a frequency corresponding to the natural mode and a phase shifter for adjusting the phase shift of each filtered signal to the correct value;
   a damper comprising a diode rectifier coupled to the machine through a power bus and having a power rating on the order of less than or equal to about five percent of a nominal power of the machine, a resistor coupled to a DC output of the diode rectifier, and a pulse width modulated (PWM) element coupled in series with the resistor and configured for receiving the control signals.

21. The damping system of claim 20 wherein the controller further comprises a gain element for controlling the magnitude of the adjusted signal.

* * * * *